US008760452B2

(12) United States Patent
Tiggs et al.

(10) Patent No.: US 8,760,452 B2
(45) Date of Patent: Jun. 24, 2014

(54) INTEGRATED GRAPHICS PROCESSOR DATA COPY ELIMINATION METHOD AND APPARATUS WHEN USING SYSTEM MEMORY

(75) Inventors: Gary C. Tiggs, Daly City, CA (US); Earl M. Stahl, Hillsborough, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 611 days.

(21) Appl. No.: 12/828,692

(22) Filed: Jul. 1, 2010

(65) Prior Publication Data

US 2012/0001927 A1 Jan. 5, 2012

(51) Int. Cl.
G06F 15/00 (2006.01)
G06T 1/00 (2006.01)
G06T 15/00 (2011.01)
G09G 5/36 (2006.01)
G06F 1/32 (2006.01)

(52) U.S. Cl.
CPC ............. G06F 1/3293 (2013.01); G09G 5/363 (2013.01)
USPC ............................ 345/501; 345/522; 345/556

(58) Field of Classification Search
None
See application file for complete search history.

(56) References Cited

U.S. PATENT DOCUMENTS

| 8,259,119 B1* | 9/2012 | Diard ............................ 345/502 |
| 2002/0145611 A1* | 10/2002 | Dye et al. ...................... 345/543 |
| 2008/0204461 A1* | 8/2008 | Hutchins et al. .............. 345/506 |
| 2010/0138675 A1* | 6/2010 | Nikazm et al. ................ 713/300 |
| 2010/0164968 A1* | 7/2010 | Kwa et al. ...................... 345/545 |
| 2011/0145468 A1* | 6/2011 | Diard et al. ................... 710/313 |
| 2011/0216078 A1* | 9/2011 | Blinzer ......................... 345/502 |

* cited by examiner

Primary Examiner — Maurice L McDowell, Jr.
Assistant Examiner — Donna J Ricks
(74) Attorney, Agent, or Firm — Volpe and Koenig, P.C.

(57) ABSTRACT

A method and apparatus for processing data in a system comprising a central processing unit (CPU), a system memory, and a graphics processing unit (GPU) includes determining whether the GPU is an integrated graphics processor (IGP). Based upon a determination that the GPU is an IGP, data stored in the system memory is accessed by the GPU without copying the data to a memory on the GPU. Processing is performed on the data in the GPU.

15 Claims, 2 Drawing Sheets

INTEGRATED GRAPHICS PROCESSOR DATA COPY ELIMINATION METHOD AND APPARATUS WHEN USING SYSTEM MEMORY

FIELD OF INVENTION

This application is related to processing data.

BACKGROUND

In media transcoder software, (e.g., decoding and encoding software), a graphics processor unit (GPU) may be used to "load-balance" the encoding process by performing a task such as motion estimation (ME). The GPU performs a search, (e.g., "best search"), comparing two blocks of memory that are already decoded and resident in application memory, a reference frame, and a current frame. When a best match is found, the GPU returns motion vectors that describe, (i.e., point to), the best match in the reference frame.

Historically, ME was performed on discrete GPUs that were resident on a peripheral component interconnect-express (PCIe) or similar system bus. In order to do the motion estimation, the blocks of memory previously described were copied from the application memory, over to the video memory local to the GPU, (e.g., on the PCIe bus). The GPU operates on this video memory. In systems where the GPU resides on a video card that is only accessible over an external bus, such as an accelerated graphics port (AGP), peripheral component interconnect (PCI), or the PCIe bus, the GPU is separate from the motherboard and CPU, and does not have access directly to the system memory. In a system having an integrated graphics processor (IGP), (e.g., a system including an Advanced Micro Devices, Inc. (AMD) RS880 chipset), the GPU may be integrated into the motherboard and has access directly to the system memory via a physical connection to the central processing unit (CPU), which may include the system's main memory controller. Accordingly, the IGP may access the system memory via the CPU or the video memory that is attached directly to the IGP.

Accordingly, it would be beneficial to provide a method and apparatus that is capable of data copy elimination by using the system memory, for example where an IGP uses the same dynamic random access memory (DRAM) as the CPU.

SUMMARY

A method and apparatus for processing data in a system comprising a central processing unit (CPU), a system memory, and a graphics processing unit (GPU) is disclosed. The method includes determining whether the GPU is an integrated graphics processor (IGP). Based upon a determination that the GPU is an IGP, data stored in the system memory is accessed by the GPU without copying the data to a memory on the GPU. Processing is performed on the data in the GPU.

DETAILED DESCRIPTION OF THE EMBODIMENTS

Figure 1:
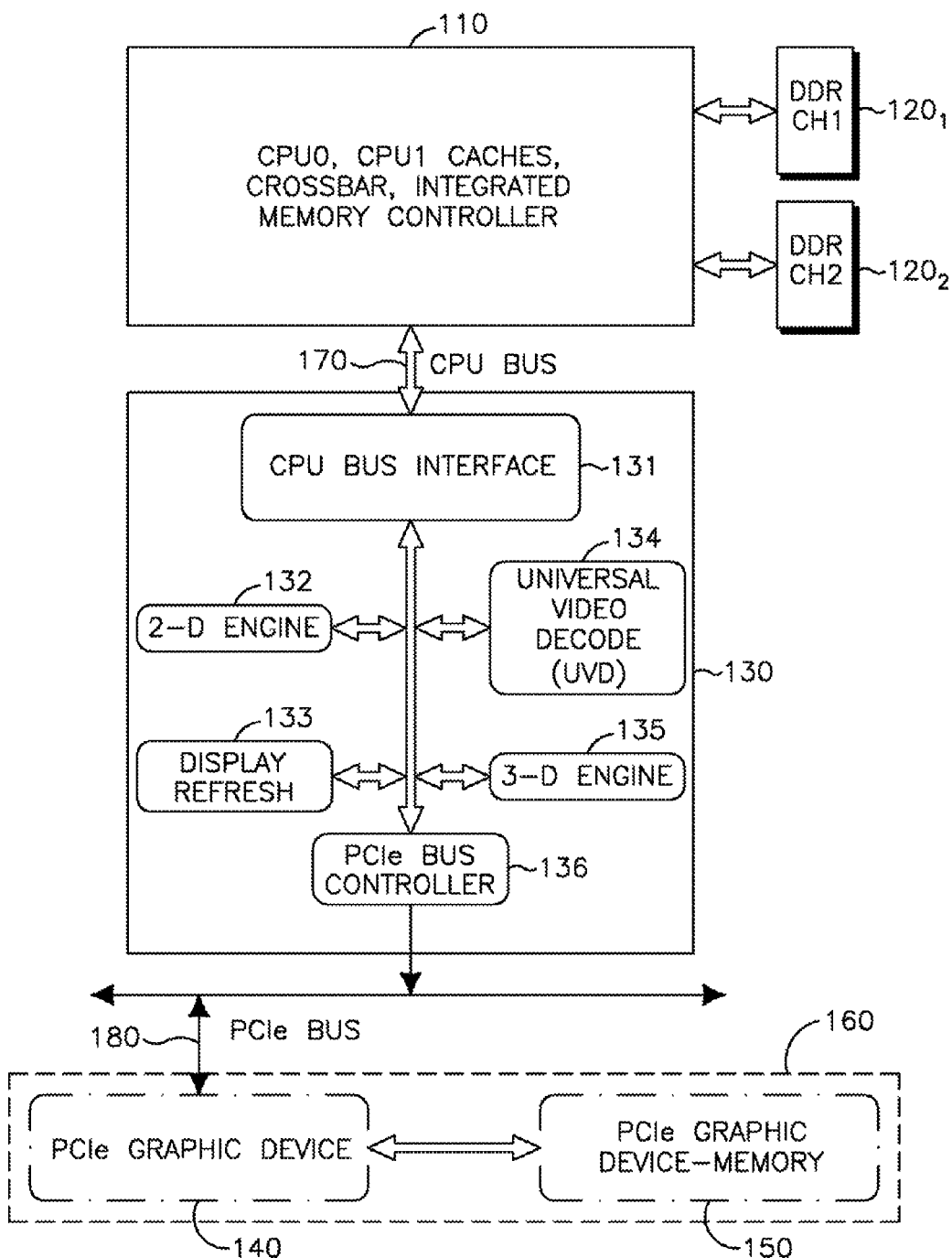
FIG. 1 is an example functional block diagram of a system including an IGP.

Where the GPU and CPU may share the same physical system memory, such as in the case where the GPU is an IGP, the GPU may access this system memory in order to perform operations on data. Accordingly, it is not necessary to make a copy of the data from the system memory. FIG. 1 is an example functional block diagram of a system 100 including an IGP. In a system that includes an IGP, the IGP may be a graphics chip that is integrated, (e.g., by direct attachment), to the motherboard as opposed to a video processor chip on a video card that is only accessible over an external bus, such as an AGP, PCI, or PCIe bus. Alternatively, an IGP as described herein may include a GPU that is integrated into the same chip as the CPU, for example on an accelerated processing unit (APU)—those processors that include both a central processing unit and a graphics processing unit.

The system 100 includes, for example, a CPU 110, memory units 120 (e.g., DDR CH1 $120_1$ and DDR CH2 $120_2$), and GPU 130. The system 100 may also include a PCIe graphic device 140 and a PCIe graphic device memory 150 accessible over a PCIe bus 180. Together, the PCIe graphic device 140 and the PCIe graphic device memory 150 may be referred to as a PCIe processing unit 160. The CPU 110 of the present example includes a CPU0, CPU1, Caches, Crossbar, and an Integrated Memory Controller. The GPU 130 includes a CPU bus interface 131, a 2-D engine 132, a display refresh 133, universal video decode (UVD) 134, 3-D engine 135, and PCIe bus controller 136. The GPU 130 communicates with the CPU 110 over a CPU bus 170 and shares access to the memory units 120. The PCIe graphic device 140 may also include a UVD, 3-D and 2-D engine, and a display refresh and is in communication with the PCIe graphic device-memory 150. The PCIe graphic device 140 may communicate with the PCIe bus controller 136 of the GPU 130 over the PCIe bus 180. Together, the components of the system 100 may utilize a CPU ID application programming interface (API) and a compute abstraction layer (CAL) API to utilize accelerators in the system.

The CPU 110 and GPU 130 may be integrated into the same chip, or die, and therefore may be considered an APU. In this case, the GPU 130 may be referred to as an IGP.

Figure 2:
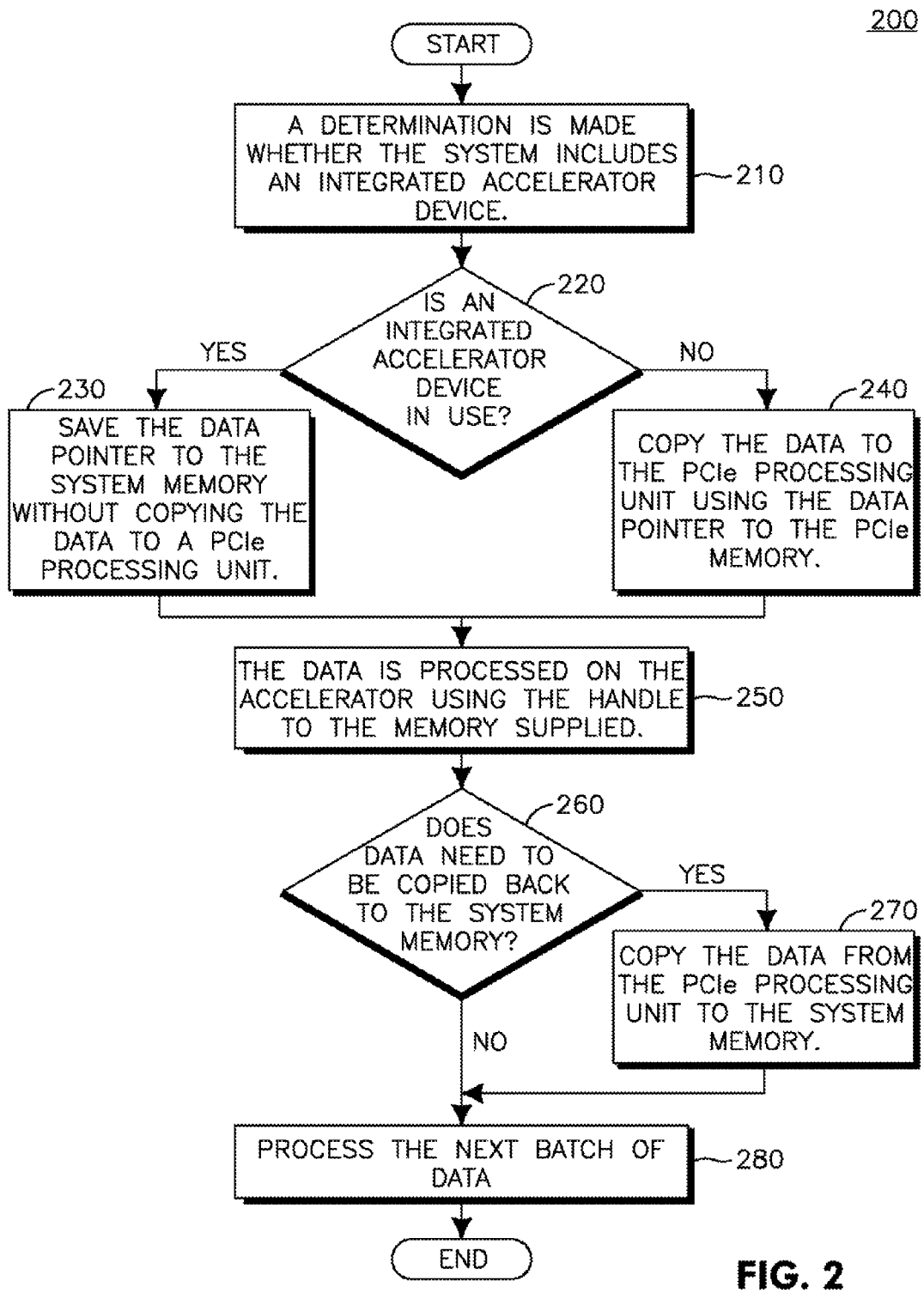
FIG. 2 is an example flow diagram of a method for performing a data processing function.

FIG. 2 is an example flow diagram of a method 200 for performing a data processing function. In step 210, a determination is made whether the system, (e.g., system 100), includes an integrated accelerator device, (e.g., an IGP included on the motherboard of the system 100). Using the example of system 100, the integrated accelerator device may include the GPU 130. This determination may be performed using a chipset identification (ID), CPUID or other operating system (OS) API function. For example, this determination may be made by examining the chipset documentation to verify that there are areas in memory sharable with the CPU 110, or by using a "memory-test", where a pattern is written into the CPU system memory 120, and subsequently, the GPU 130 is programmed to verify this pattern, or vice-versa, that both processors are using the same physical address.

In one example, where CPUID and CAL APIs are utilized, the CPUID API may provide a family, model, and stepping value of the CPU 110. The CAL API may then determine a count of devices that share memory with the CPU 110.

If an integrated accelerator device is in use (step 220), an indicator, such as a CPU_IGP Shared Memory Bit may be set equal to "1" to indicate the existence of an IGP, whereas if an integrated accelerator device is not in use, then the CPU_IGP Shared Memory Bit may be set to "0" to indicate an IGP is not in use. Since the data is currently in the system memory 120, the setting of the CPU_IGP Shared Memory Bit indicates whether or not the data is to be copied to the PCIe accelerator device in order to perform processing on the data.

For example, when performing motion estimation, raw data such as YUV data of previous or future pictures are to be encoded. The accelerators, (e.g., GPU 130), that are sharing memory with the CPU 110 divide or sub-divide the block of raw data of the current block to be encoded into sub-blocks, (e.g., 16×16 pixels). The accelerators search the previous or future picture frames for the block of data that best matches the current block to be encoded. In other applications that share memory, the data operated on by the accelerators could be large matrices of floating point data that may be used to transform a three-dimensional (3D) X, Y, Z, W vertex (3D point).

Accordingly, in the present example, if the CPU_IGP Shared Memory Bit is "1", indicating the presence of an IGP in use in step 220, then the data pointer in the system memory is saved without copying the data to the PCIe processing unit 160 (step 230). The data pointer saved in the system memory is abstracted by the handle for processing. This handle may be the numeric value that the API assigns to the application to represent a resource, such as a block of memory. The application uses the handle to operate on, and represent the block of memory, and the handle is a structure that contains values such as the memory address of the resource. The CPU 110, or GPU 130, utilizes this to operate on the memory. The memory address to the resource referred to is the data pointer.

For example, the CPU's 110 and IGP's (GPU 130) memory address space might be located in the system memory 120 from address 0x000000 to 0x0FFFFF (hexidecimal). The PCIe processing unit's 160 memory address space) might be located from 0x100000 to 0x1FFFFF (hexidecimal). Both address-spaces in this example are 1 megabyte in size. On IGP systems that may employ this application, both CPU and IGP GPU address spaces may be in the same physical DRAM chip, such as both in DDR CH1 120$_1$ or both in DDR CH2 120$_2$, or the address spaces may be on different DRAM chips on the system board. For example, the CPU's 110 address space is on DDR CH1 120$_1$ and the IGP GPU's 130 address space is on DDR CH1 120$_2$. The GPU 130 in these cases has read/write access to the system memory 120 at the same physical address as that used by the CPU 110.

Alternatively in the present example, if the CPU_IGP Shared Memory Bit is "0" in step 220, (i.e., an IGP is not in use), data is copied to the PCIe processing unit 160 using the data pointer to the PCIe graphic-device memory 150 (step 240). The data pointer to the PCIe graphic-device memory 150 is obtained from the handle for processing in this example.

In step 250, the data is processed on the accelerator using the handle to the memory, (i.e., 120 or 150), supplied in either steps 230 or 240. For example, motion estimation, or other processes as described above, may be performed on the data in step 250. It is then determined whether the data needs to be copied back to the system memory 120 (step 260). In the present example, the determination may be that the data does not need to be copied back to the system memory 120 if the CPU_IGP Shared Memory Bit was set to "1", or does need to be copied back into the system memory if the CPU_IGP Shared Memory Bit was set to "0".

If the data needs to be copied back into the system memory in step 260, (e.g., the CPU_IGP Shared Memory Bit was set to "0"), the data is copied from the PCIe processing unit 160 back to the system memory (step 270). This may be performed by using the pointer to the PCIe graphic-device memory 150 and the handle for processing. The next batch of data is then processed (step 280), if such a batch exists, by returning to step 210.

If the data does not need to be copied back into the system memory in step 260, (e.g., the CPU_IGP Shared Memory Bit was set to "1"), then since the copying of the data from the PCIe processing unit 160 to the system memory step may be skipped, the next batch of data may then be processed (step 280), if such a batch exists, by returning to step 210. Since the copying step is skipped, a time savings may occur.

One example of performing the method 200 is by modifying code to provide for the GPU 130 to access the data in the system memory 120 without having to copy the data in the system memory 120 when the GPU is an IGP. For example, where the GPU 130 is an IGP, code may be executed that skips a step of copying the data from the system memory 120 to memory of the GPU 130. Alternatively, when the GPU is not an IGP, code may be executed that causes the data to be copied first to the GPU memory and then back to the system memory after processing of the data. Also, although for example purposes, the PCIe graphic device 140 communicates over the PCIe bus, a PCIe graphic device that may have access directly to the system memory 120 may utilize the above method 200. In this example however, there may be a difference in bandwidth compared to that of an IGP device.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions (such instructions capable of being stored on a computer readable media). The results of such processing may be maskworks that are then used in a semiconductor manufacturing process to manufacture a processor which implements aspects of the present invention.

What is claimed is:

1. A method for processing data in a system comprising a central processing unit (CPU), a system memory, and a graphics processing unit (GPU), the GPU associated with a memory, comprising:

responsive to a determination that the GPU is an integrated graphics processor (IGP), accessing data stored in the system memory by the GPU without copying the data to the memory associated with the GPU, wherein the determination includes setting a shared memory bit to a first value to indicate the GPU is an IGP and setting the shared memory bit to a second value to indicate the GPU is not an IGP;

performing processing on the data in the GPU; and wherein if the shared memory bit is set to the first value, data is not copied back to the system memory after processing, and wherein if the shared memory bit is set to the second value, data is copied back to the system memory after processing.

2. The method of claim 1 wherein determining whether the GPU is an IGP further includes determining whether the GPU and CPU share the system memory.

3. The method of claim 2, further comprising analyzing a chipset identification (ID) to determine whether or not the GPU and CPU share the system memory.

4. The method of claim 2, further comprising writing a pattern into the system memory and verifying the pattern by the GPU to determine whether or not the GPU and CPU share the system memory.

5. The method of claim 1, further comprising saving a data pointer to the system memory, wherein the data pointer includes a handle that represents a memory resource.

6. The method of claim 1 wherein the processing includes performing motion estimation on the data.

7. A system, comprising:
    a central processing unit (CPU) including a first memory; and
    an integrated graphics processing unit (IGP) associated with a second memory, the IGP configured to access data in the first memory without copying the data from the first memory into the second memory associated with the IGP upon a determination that a shared memory bit is set to a first value to indicate the GPU is an IGP, perform processing of the data, and wherein if the shared memory bit is set to the first value, data is not copied back to the first memory after processing.

8. The system of claim 7 wherein the IGP is further configured to save a data pointer to the first memory, wherein the data pointer includes a handle that represents a memory resource.

9. The system of claim 7 wherein the IGP is further configured to verify a pattern written in the first memory.

10. The system of claim 7 wherein the IGP and CPU are integrated on a same chip.

11. The system of claim 7 wherein the IGP and CPU are integrated on a same motherboard.

12. An accelerated processing unit (APU), comprising:
    a central processing unit (CPU) in electrical communication with a first memory; and
    a graphics processing unit (GPU) associated with a second memory, the GPU configured to access data from the first memory without copying the data from the first memory into the second memory of the GPU upon a determination that a shared memory bit is set to a first value to indicate the GPU is an integrated graphics processor (IGP), perform processing on the data, and wherein if the shared memory bit is set to the first value, data is not copied back to the first memory after processing.

13. The APU of claim 12 wherein the CPU and GPU are integrated on a same chip.

14. A system, comprising:
    a first memory; and
    an accelerated processing unit (APU), comprising:
        a central processing unit (CPU); and
        a graphics processing unit (GPU) associated with a second memory;
    wherein the CPU is in electrical communication with the first memory and the GPU is configured to access data from the first memory without copying the data from the first memory into the second memory of the GPU upon a determination that a shared memory bit is set to a first value to indicate the GPU is an integrated graphics processor (IGP), perform processing on the data, and wherein if the shared memory bit is set to the first value, data is not copied back to the first memory after processing.

15. The system of claim 14 wherein the CPU and GPU are integrated on a same chip.

* * * * *